United States Patent [19]
Nilsson

[11] 3,811,784
[45] May 21, 1974

[54] MEANS FOR INTERCONNECTING TWO MACHINE ELEMENTS

[75] Inventor: Sven Walter Nilsson, Goteborg, Sweden

[73] Assignee: SKF Industrial Trading and Development Company NV, Amsterdam, Netherlands

[22] Filed: Mar. 1, 1972

[21] Appl. No.: 230,744

[52] U.S. Cl. .................................................. 403/2
[51] Int. Cl. ....................... F16b 39/34, F16c 11/10
[58] Field of Search .... 287/52.9, 53 S, 53 R, 52.03, 287/52.07, DIG. 3; 151/28, 14.5, 2 R; 285/2, 3; 85/83, 76, 72, 77

[56] References Cited
UNITED STATES PATENTS

| | | | |
|---|---|---|---|
| 771,935 | 10/1904 | Reynolds | 151/14.5 |
| 3,459,447 | 8/1969 | Hurd | 151/2 R |
| 1,511,910 | 10/1924 | Royce | 287/53 S |
| 3,525,365 | 8/1970 | Meulendyk | 85/83 |
| 3,399,910 | 9/1968 | Fawkes | 287/52.05 |
| 1,685,098 | 9/1928 | Sklovsky | 287/DIG. 3 |
| 2,001,290 | 5/1935 | Thompson | 151/14.5 |

FOREIGN PATENTS OR APPLICATIONS

| | | | |
|---|---|---|---|
| 1,105,669 | 3/1959 | Germany | 287/53 SS |
| 214,746 | 5/1924 | Great Britain | 287/53 |

Primary Examiner—Reinaldo P. Machado
Attorney, Agent, or Firm—Howson and Howson

[57] ABSTRACT

In order to lock two machine elements with respect to each other, an annular void is formed between the two elements, and a correspondingly shaped locking member is forced into said void. To obtain a secure grip between the components, the juxtaposed side walls of the void are provided with knurls or keys, and the locking member is made of a material which is softer than that of the elements. The member will be deformed when driven into the void, but it will not cause any damage to the elements. The member may therefore be removed and a new member be applied after an angular adjustment of the relative position between the elements. The member can be designed not to fill the full peripheral extension of the void, in which case it, when used in a torque transmitting transmission, will serve as a rupture safety device.

12 Claims, 15 Drawing Figures

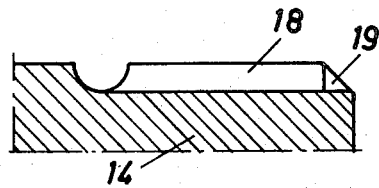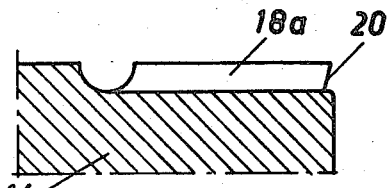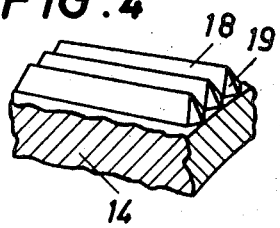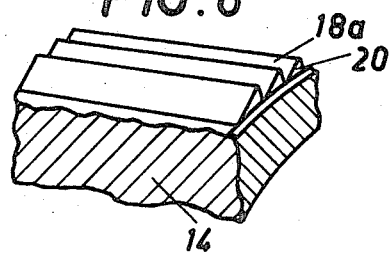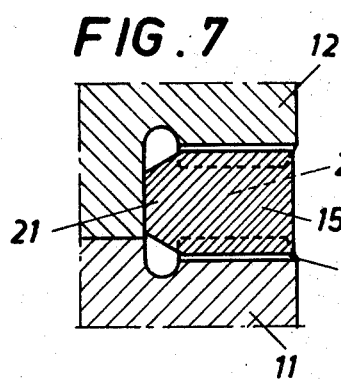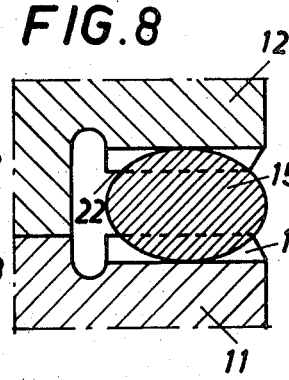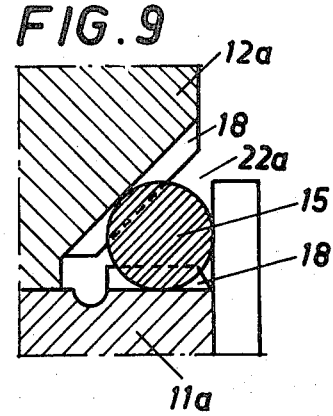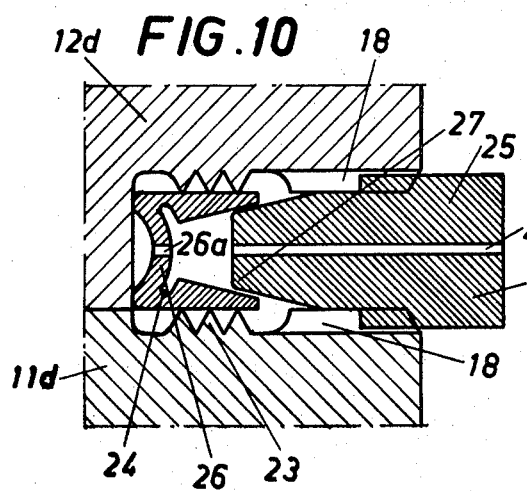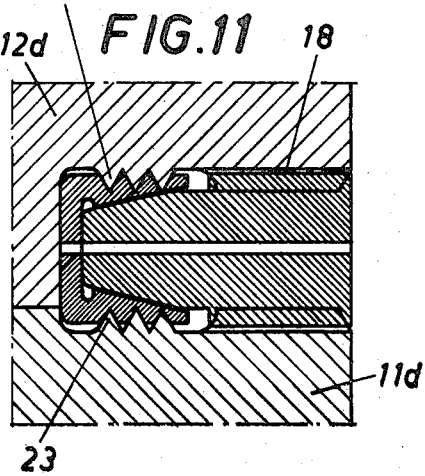

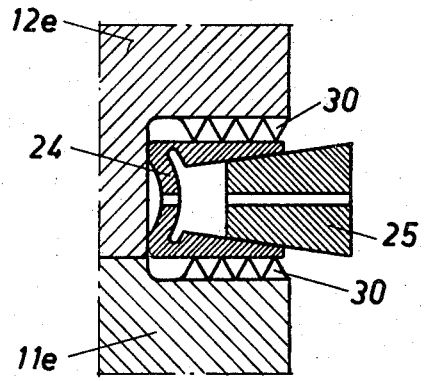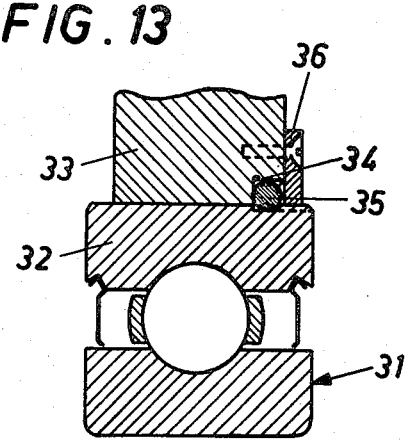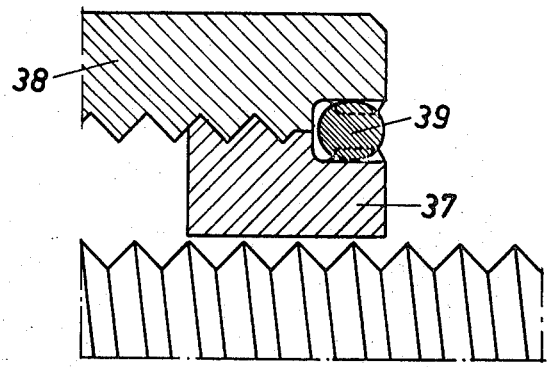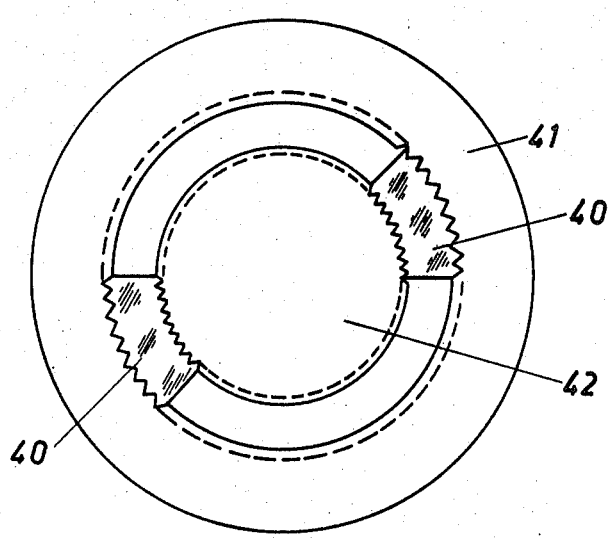

MEANS FOR INTERCONNECTING TWO MACHINE ELEMENTS

BACKGROUND OF THE INVENTION

On many occasions it is desired to lock two machine elements in relation to each other, and a number of different arrangements to that end have been proposed from time to time.

The present invention proposes a means which is simple to fit, and which provides a very good locking. By the choice of a suitable material in the components, the locking may be made permanent, or it may be arranged to be easily released in order to permit an adjustment of the relative position of the elements, and then once again be applied. By a suitable shaping and a selection of material, it is furthermore possible to utilize the locking means as a rupture safety device.

SUMMARY OF THE INVENTION

The invention may be utilized with machine elements of which one at least partly encircles the other in such a manner that an annular void is formed between the elements, into which void an annular locking member, which in its basic concept has a radial cross sectional measure being substantially equal to the width of the annular void, may be introduced. The invention is characterized in that the juxtaposed surface of the void formed between the elements are provided with knurls, and that the locking member is manufactured from a material having a lower degree of hardness, than the material in the elements. These knurls may be formed as straight keys being parallel too, or arranged at an angle to the axial direction of the elements. Each knurl preferably has a triangular cros section, and will, when the locking member is forced into the void, cut a keyway into or compress the body thereof.

BRIEF DESCRIPTION OF THE DRAWINGS

FIGS. 3 and 4 show the shape of one design of the keys;

FIGS. 5 and 6 show an alternative design of the keys;

FIGS. 7 and 8 show different cross sections of the locking member;

FIG. 9 shows an embodiment of the void, the shape of which differs somewhat from those shown in the earlier figures;

FIGS. 10–12 show modifications in order to obtain a radial as well as an axial locking between the elements; and FIGS. 12–15 show examples of different ways of locking two machine elements.

DESCRIPTION OF SOME PREFERRED EMBODIMENTS

Figure 1:
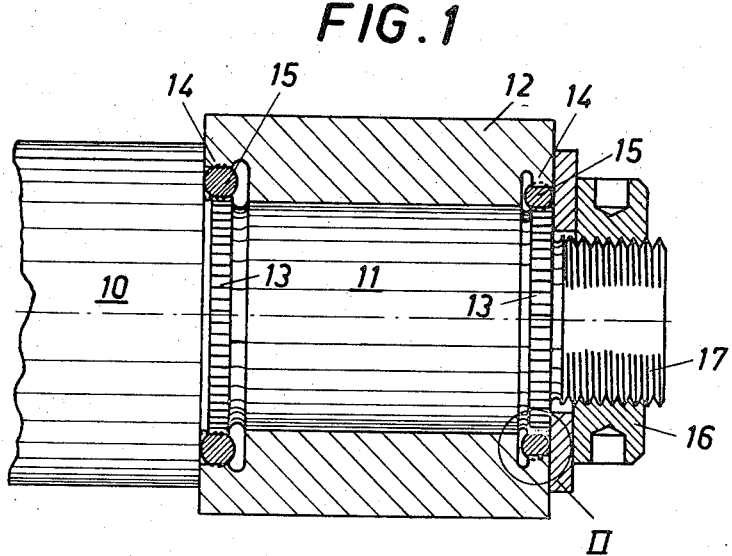
FIG. 1 shows a basic embodiment of the invention as utilized with a hub being locked against rotation on a shaft by means of two annular locking members according to the invention.

FIG. 1 shows a typical example of the utilization of the invention. A shaft 10 is provided with an extending spigot 11 upon which a hub, a bushing or some other sleeve shaped element 12 is to be retained in such a manner, that it will not rotate in relation to the shaft. Spigot 11 is at each end provided with a flange 13, at each of which a number of axial keys of the type to be shown and described in connection with FIGS. 3–6 are formed. The main portion of the hub 12, which is directly supported by spigot 11, is provided with recesses defined by flange-like portions 14 opposite to flanges 13, and likewise provided with axially directed keys. A locking member 15 may be forced into each of the annular voids 22, which will be formed between the juxtaposed faces of flanges 13 and 14. The locking members 15 are made of a material which is softer than the material in the spigot and the hub, respectively, and the keys therefore will cut into the body of the locking members 15 in such a manner that these will be deformed and effectively will lock the elements with respect to each other.

In the embodiment shown in FIG. 1 two similar locking members are used, and it will then be necessary to ensure that the locking member to be fitted into the void adjacent to shaft 10 will have such a dimension, that it may pass through the void for the locking member at the outer end of the spigot. The hub may be locked against axial displacement by means of a nut 16, which in a well known manner is threaded onto a correspondingly shaped portion 17 at the end of the spigot.

Figure 2:
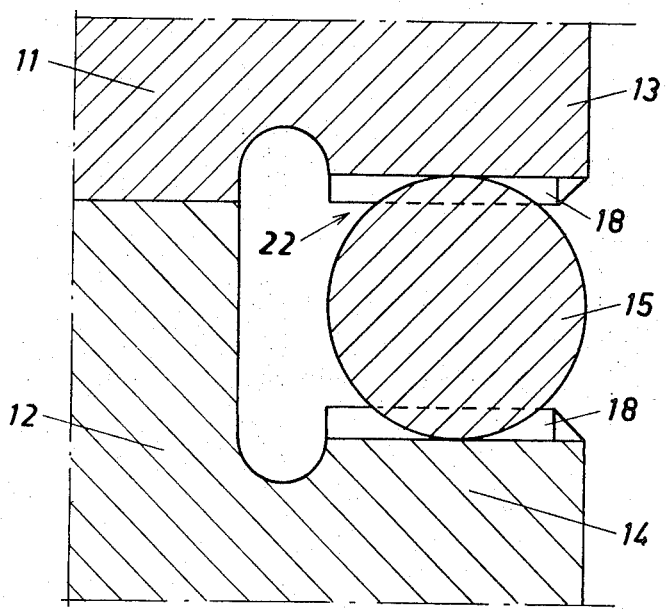
FIG. 2 on a larger scale shows a detail of the encircled portion denoted by II on FIG. 1.

FIG. 2 shows on a larger scale the portion around the locking member. The keys 18 are of the type shown in FIG. 3 and 4, and it is evident that the shape of the locking member, after having been forced into the void, will not always have the ideal circular cross section shown in the drawing, but may be locally deformed depending upon the force required to perform the introduction.

The shape of the keys shown in FIGS. 3 and 4 is suited for axially directed keys, and they have a substantially tri-cross section. The end of each key turned towards the entrance of the void is shaped as an edge 19. When the locking member is forced against the keys, the sharp edges will easily enter into the softer material of the locking member and will compress parts of the latter into the grooves between the keys.

FIGS. 5 and 6 show a somewhat modified embodiment of the keys. These are here denoted by 18a and the edge portions thereof by 20. The edges are here formed in such a manner that they, together with the end portion of the pertaining element, form a cutting edge which, when the locking member is introduced, will cut grooves in the body of the latter.

The shape of the keys shown in these Figures is suitable when it is desired to obtain a safe locking against angular movement. On many occasions, the requirements concerning locking are not so rigid. The shape of the keys must of course be suited to the actual requirement and to the material in the components in question. The keys may be arranged at an angle to the longitudinal axis of the elements, and if the locking member is formed in such a manner that it may be expanded within the void, the keys may possibly be formed by cross knurling. As a collective name for keys of different shapes and directions, the words knurls will be used in the claims.

FIGS. 7 and 10 show different cross sections of the locking member. This may be designed as a closed annulus having a diameter suited to the void, but it may also be supplied in long lengths, which are cut to suitable size. As the locking member is made of soft material it is easy to form the same in a manner suited the void. It is for the locking function not absolutely necessary that the ends of the annulus meet exactly. On many occasions it will be quite satisfactory with a small clearance between the ends, so the exactness, when cutting the lengths, does not need to be so high.

FIG. 7 shows a locking member 15c provided with a wedge-shaped front portion 21. The biggest measure of the cross section is chosen with respect to the material used in the annulus so the grooves between the keys will be substantially filled when the member is introduced. FIG. 8 shows a locking member 15a having an oval cross section. In these embodiments, the elements 13 and 14 are formed in such a manner, that a fillet mold is formed inside the keys into which chips cut out from the member by the keys may be pushed. In order to facilitate the introduction of the locking member, the front portion thereof is wedge shaped or circuate as viewed in cross section.

FIG. 9 shows a modified embodiment of the components, where a first element 11a and a second element 12a together define a wedge-shaped void 22a. The side walls of this void are provided with keys 18, and the locking member is constituted by an annulus 15 of circular cross section.

In the embodiments above described, the keys have been axially directed. In order to obtain a locking against turning as well as axial displacement it is possible, as shown in FIGS. 10 and 11, to form a void between the two machine elements 11d and 12d, where the juxtaposed side walls are provided with axially directed keys 18, as well as with circumferentially directed keys 23. The latter are then located axially inside of keys 18, and may be formed as a helical thread, or as one or more circular ribs. On this occasion a divided locking member consisting of an inner annulus 24 and an outer annulus 25 is provided. Annulus 24 has a substantially U-shaped cross section, where the internal side walls of the flanges define a wedge-shaped void. The bottom portion 26 of annulus 24 is concave in the basic concept as viewed from the outside, and is provided with at least one deaeration opening 26a. The outer annulus 25 has a front portion 27, which is designed to enter between the flanges of annulus 24, and an outer portion 28 designed to cooperate with keys 18. The outer annulus is likewise provided with at least one deaeration passage 29, in such a manner that no air will be locked between the two annulli, when they are forced together. The shape of the locking member in mounted position is shown in FIG. 11.

A modification of this arrangement is shown in FIG. 12, where two elements 11e and 12e are locked together by means of annuli 24 and 25 of basically the same shape as described in connection with FIGS. 14 and 15. Here, however, the keys 30 in the juxtaposed faces of the void are shaped in such a manner that they show axially as well as circumferentially directed portions. This may possibly be obtained by means of cross knurling.

FIG. 13 shows a roller bearing 31, the outer race ring 32 of which cooperates with a seat in a housing 33. In order to prevent a rotation of the outer race ring in relation to housing, the ring formerly usually was mounted with a hard fit or by some kind of conventional locking means. In the embodiment shown, the housing is provided with a recess 34, one face of which, as well as the juxtaposed face of the race ring, are provided with axial keys between which a locking member 35 is introduced. In order to prevent the locking member from being accidentally removed, a ring disc 36 is mounted outside the member. In FIG. 14 a similar arrangement at a portion of a ball nut mechanism is shown, where element 37 is locked with respect to nut 38 by means of a locking member 39 introduced into a void between the mentioned elements, the side walls of which are provided with keys.

In FIG. 15 two locking members 40 mounted diametrically opposite each other are used as a rupture safety device between an outer sleeve 41 and an internal machine element 42 forming part of a transmission. The faces cooperating with the locking member are provided with keys. By suitable choice of material in the locking members and of the length of the latter in the peripheral direction the torque to be transmitted may be selected within wide limits. In order to increase the torque transmitted by the transmission more than two locking members may of course be used. Should the torque increase above the value determined by the locking members the latter will be deformed and the transmission released.

What I claim is:

1. Means for interconnecting two machine elements having smooth contacting surfaces forming part of a torque transmitting transmission where a first element encircles at least part of the other element in such a manner than an annular void having face portions formed between the two elements, uninterrupted knurls at the juxtaposed faces of said void, and an arcuate locking member manufactured from a material having a lower degree of hardness than the material of the elements and shaped to fit into said void but having a peripheral extension less than that of the void, the arcuate length of the member and the material thereof being chosen in such a manner with respect to the torque to be transmitted that the member will act as a rupture safety device.

2. A combination comprising a pair of machine members having smooth contacting surfaces, said members each having overlying spaced circumferentially extending voids having face portions defining an annular space therebetween, means defining a plurality of circumferentially closely spaced uninterrupted knurls extending for predetermined axial length of said annular space in the confronting spaced face portions of said members, and an annular locking member of deformable material adapted to fit into said annular space to engage in the keys defined by said knurled face portions thereby to limit relative movement of said members.

3. The combination according to claim 2, in which the knurls in the elements are designed as axially directed keys having a substantially triangular cross section.

4. The combination according to claim 3, in which the ends of the keys turned towards the bottom of the void are defined by a peripheral filled moulding.

5. The combination according to claim 3, in which the end portion of each key turned towards the entrance of the annular space is shaped as an edge in order to facilitate the introduction of the key into the body of the member.

6. The combination according to claim 3, in which the end portion of each key is shaped in such a manner that it in cooperation with the adjacent portion of the element from which it is formed, during the introduction of the locking member will cut keyways in the body thereof.

7. The combination according to claim 2, in which the annular space is formed in such a manner that it will show two juxtaposed, parallel side walls, the locking consisting of an open or closed annulus of arbitrary cross section, said annulus having a radial thickness corresponding to the radial distance between the bottom portions of the grooves between the knurls at the two opposite side walls.

8. The combination according to claim 2 in which the two elements are designed in such a manner that the side walls of the annular space are inclined with respect to each other to form a wedge-shaped annular space into which the knurls protrude, the locking member being designed as an open or closed annulus having a circular cross section.

9. The combination according to claim 2, in which the knurls are located at an angle to the axial directed and are formed as intersecting keys.

10. Means for interconnecting two machine elements of which a first one encircles at least part of the second one in such a manner that an annular void is formed between the two elements, knurls at the juxtaposed faces of said void, and an annular locking member shaped to fit into said void and manufactured from a material having a lower degree of hardness than the material of the elements, the void between the two elements being defined by two substantially parallel walls provided with keys which are directed axially as well as circumferentially, the locking member comprising a first annulus having a U-shaped cross section and a second annulus having a basically wedge-shaped cross section and designed to be introduced into the first mentioned annulus.

11. The interconnecting means according to claim 10, in which the two sets of keys are separated in the axial direction, the circumferential keys being located innermost and the first annulus being designed to cooperate with the said innermost keys, whereas the second annulus is designed to cooperate with the axially directed, outer set of keys.

12. The interconnecting means according to claim 10, in which the axial and the circumferential keys are arranged within the same portion of the void, possibly as cross knurling, the inner annulus being designed to cooperate with both sets of keys, while the second annulus has an expanding function only.

* * * * *

UNITED STATES PATENT OFFICE
CERTIFICATE OF CORRECTION

Patent No. 3,811,784　　　　　　　　Dated May 21, 1974

Inventor(s) SVEN WALTER NILSSON

It is certified that error appears in the above-identified patent and that said Letters Patent are hereby corrected as shown below:

The following should be added:

[30] Foreign Application Priority Data

March 8, 1971 - Sweden...............2899/71

Signed and sealed this 19th day of November 1974.

(SEAL)
Attest:

McCOY M. GIBSON JR.　　　　　　　C. MARSHALL DANN
Attesting Officer　　　　　　　　Commissioner of Patents